(12) United States Patent
Endo et al.

(10) Patent No.: US 11,999,094 B2
(45) Date of Patent: Jun. 4, 2024

(54) BIAXIALLY ORIENTED POLYAMIDE FILM AND POLYAMIDE FILM MILL ROLL

(71) Applicant: TOYOBO CO., LTD., Osaka (JP)

(72) Inventors: Takuro Endo, Inuyama (JP); Kosuke Hama, Inuyama (JP)

(73) Assignee: TOYOBO CO., LTD., Osaka (JP)

( * ) Notice: Subject to any disclaimer, the term of this patent is extended or adjusted under 35 U.S.C. 154(b) by 546 days.

(21) Appl. No.: 17/424,728

(22) PCT Filed: Dec. 26, 2019

(86) PCT No.: PCT/JP2019/051145
§ 371 (c)(1),
(2) Date: Jul. 21, 2021

(87) PCT Pub. No.: WO2020/158281
PCT Pub. Date: Aug. 6, 2020

(65) Prior Publication Data
US 2022/0009151 A1     Jan. 13, 2022

(30) Foreign Application Priority Data

Jan. 28, 2019 (JP) ................................. 2019-012396
Jan. 28, 2019 (JP) ................................. 2019-012397

(51) Int. Cl.
*B32B 27/34*     (2006.01)
*B29C 55/02*     (2006.01)
(Continued)

(52) U.S. Cl.
CPC .......... *B29C 55/143* (2013.01); *B29C 55/023* (2013.01); *B29C 55/18* (2013.01);
(Continued)

(58) Field of Classification Search
CPC ..... B29C 55/143; B29C 55/023; B29C 55/18; B29C 55/14; B32B 27/34; B32B 2250/03;
(Continued)

(56) References Cited

U.S. PATENT DOCUMENTS 7,427,430 B2    9/2008   Rhee et al.
2009/0085259 A1   4/2009   Nishi et al.
(Continued)

FOREIGN PATENT DOCUMENTS

CN       102239204 A    11/2011
JP        2623939 B2     6/1997
(Continued)

OTHER PUBLICATIONS

China National Intellectual Property Administration, Office Action in Chinese Patent Application No. 201980090476.X (Aug. 11, 2022).
(Continued)

*Primary Examiner* — John D Freeman
(74) *Attorney, Agent, or Firm* — Leydig, Voit & Mayer, Ltd.

(57) ABSTRACT

To provide a gas barrier biaxially oriented polyamide film and a polyamide film mill roll, even as a product that is close to an end of a mill roll, having favorable mechanical characteristics, thermal characteristics, and few S-shape curling due to moisture absorption after being made into a bag. A biaxially oriented polyamide film having at least one layer formed of a polyamide resin containing not lower than 60% by mass of poly(m-xylylene adipamide), wherein a molecular orientation angle of the film is not smaller than 20°, a strain at moisture absorption of the film is not higher than 1.3%, an impact strength of the film is not lower than
(Continued)

0.7 J/15 μm, and a heat shrinkage rate, after heating for ten minutes at 160° C., of the film is 0.6 to 3.0% in both an MD direction and a TD direction.

16 Claims, 2 Drawing Sheets

(51) Int. Cl.
  *B29C 55/14* (2006.01)
  *B29C 55/18* (2006.01)
  *C08L 77/02* (2006.01)
  *C08L 77/10* (2006.01)
  *B29K 77/00* (2006.01)

(52) U.S. Cl.
  CPC .............. *B32B 27/34* (2013.01); *C08L 77/02* (2013.01); *C08L 77/10* (2013.01); *B29K 2077/00* (2013.01); *B29K 2995/0053* (2013.01); *B29K 2995/0089* (2013.01); *B32B 2250/03* (2013.01); *B32B 2250/24* (2013.01); *B32B 2250/40* (2013.01); *B32B 2307/518* (2013.01); *B32B 2307/558* (2013.01); *B32B 2307/7244* (2013.01); *B32B 2307/736* (2013.01); *B32B 2439/70* (2013.01); *C08L 2203/16* (2013.01)

(58) Field of Classification Search
  CPC ............ B32B 2250/24; B32B 2250/40; B32B 2307/518; B32B 2307/558; B32B 2307/7244; B32B 2307/736; B32B 2439/70; B32B 27/08; B32B 2264/1021; B32B 2270/00; B32B 2307/54; B32B 2307/72; B32B 2307/748; B32B 2439/06; B32B 27/16; B32B 27/18; B32B 2307/724; C08L 77/02; C08L 77/10; C08L 2203/16; B29K 2077/00; B29K 2995/0053; B29K 2995/0089; C08J 5/18; C08J 2377/06

See application file for complete search history.

(56) References Cited

U.S. PATENT DOCUMENTS

| | | |
|---|---|---|
| 2012/0238164 A1 | 9/2012 | Touraud et al. |
| 2015/0064485 A1 | 3/2015 | Shimizu et al. |

FOREIGN PATENT DOCUMENTS

| | | | |
|---|---|---|---|
| JP | 2002-205332 A | | 7/2002 |
| JP | 2004090527 A | * | 3/2004 |
| JP | 3726304 B2 | | 12/2005 |
| JP | 2006015742 A | * | 1/2006 |
| JP | 2012-254804 A | | 12/2012 |
| JP | 2012-532938 A | | 12/2012 |
| TW | 200704499 A | | 2/2007 |
| TW | 201813818 A | | 4/2018 |

OTHER PUBLICATIONS

Intellectual Property India, Examination Report in Indian Patent Application No. 202147036517 (Aug. 18, 2022).
Intellectual Property India, Hearing Notice in Indian Patent Application No. 202147036517 (Apr. 13, 2023).
Taiwan Intellectual Property Office, Office Action in Taiwanese Patent Application No. 108146473 (Mar. 25, 2023).
Japanese Patent Office, International Search Report in International Patent Application No. PCT/JP2019/051145 (Mar. 24, 2020).

* cited by examiner

BIAXIALLY ORIENTED POLYAMIDE FILM AND POLYAMIDE FILM MILL ROLL

CROSS-REFERENCE TO RELATED APPLICATIONS

This patent application is the U.S. national phase of International Patent Application No. PCT/JP2019/051145, filed Dec. 26, 2019, which claims the benefit of Japanese Patent Application No. 2019-012396, filed Jan. 28, 2019, and Japanese Patent Application No. 2019-012397, filed Jan. 28, 2019, which are incorporated by reference in their entireties herein.

TECHNICAL FIELD

The present invention relates to a biaxially oriented polyamide film used for packaging food and the like and having excellent impact resistance and pinhole resistance and excellent gas barrier properties. In particular, the present invention relates to a biaxially oriented polyamide film and a polyamide film mill roll that have gas barrier properties and that experience few S-shape curling phenomena caused by moisture absorption when a film close to an end in the transverse direction of a mill roll is processed into a bag for packaging food.

BACKGROUND ART

In general, biaxially oriented polyamide films containing poly(m-xylylene adipamide) (hereinafter, abbreviated as polyamide MXD6) have a low permeability for oxygen or the like and excellent gas barrier properties, and thus are widely used as materials for packaging various kinds of food and the like. However, conventional biaxially oriented polyamide MXD6 films are elongated due to moisture absorption in a high-humidity environment. Thus, when the films are processed into bags, the bags curl in S-shapes due to moisture absorption. Consequently, problems arise in that: the bags are not easily boxed; and a malfunction occurs at a conveying portion of a device for filling the bags with contents.

Such problems are likely to arise if a bag is made of a slit roll film close to an end of a mill roll. Here, the mill roll refers to a film roll that is wound after both ends are trimmed in a film manufacturing process and that extends over the entire width of a film manufacturing device. The slit roll refers to a film roll obtained by slitting the mill roll so as to have a smaller width in order to perform printing processing, lamination processing, or the like.

The above-described polyamide film used for the purpose of packaging food ordinarily has a surface subjected to printing and then is laminated with a polyolefin-based resin film made of polyethylene (PE), polypropylene (PP), or the like. The resultant laminate is folded in half parallelly in the machine direction with the polyamide film facing outward, has three sides thermally fused, and is cut, thereby being made into a three-side sealed bag having one side in an opened state. Then, the bag is filled with content, tightly sealed, and supplied to the market.

Such a polyamide film used for the purpose of packaging food is manufactured mainly by a biaxial stretch method. However, the biaxially oriented polyamide film manufactured by the biaxial stretch method is prone to variations in physical properties in the transverse direction of the film. One cause of the variations in physical properties in the transverse direction is considered to be a bowing phenomenon. The bowing phenomenon is considered as a phenomenon in which, when temperature rise occurs in a heat-fixing treatment process and shrinkage stress is generated in a machine direction, both end portions of a film are held and bound with clips whereas a center portion of the film shrinks owing to weak binding force, so that a main axis of orientation is tilted in a bow shape in the transverse direction.

Owing to the bowing phenomenon, a main axis (an angle at which a largest value is obtained) for physical property values such as a heat shrinkage rate, a rate of dimensional change due to moisture absorption, and a refractive index varies in the transverse direction of the film. This leads to increases in the physical property value differences of the heat shrinkage rate and the rate of dimensional change due to moisture absorption in a diagonal direction.

That is, if a bag is made of a biaxially oriented polyamide film for packaging food obtained by a conventional method, the main axis direction of the orientation differs between outside and inside of the bag folded in half owing to the bowing phenomenon. Thus, the dimensional change also differs between the outside and the inside, whereby warpage occurs at a corner of the bag. That is, a phenomenon in which two sides of the bag curl in S-shapes (hereinafter, simply referred to also as S-shape curling) occurs. Consequently, it may become difficult to put the bag in a box when boxing the bag, and a malfunction may occur at a conveying portion of a device for filling the bag with content.

As a measure against the bowing phenomenon, a method has been proposed in which misalignment due to moisture absorption is reduced by a polyamide film that is obtained by performing transverse stretch, then cooling, and then heat setting and that satisfies a specific relationship between a shrinkage strain in boiling water and a difference in molecular orientation angle (see Patent Literature 1). However, a bag made of a slit roll that is a film close to an end of a mill roll may experience S-shape curling due to moisture absorption.

In addition, a method has been proposed in which S-shape curling after treatment with boiling water is reduced by a biaxially orientated polyamide-based resin film that is characterized by being obtained by stretch in a machine direction in two stages and that has an α-type crystal orientation main axis direction not larger than 14 degrees relative to the machine direction or a transverse direction of the film (see Patent Literature 2).

However, even with this method, a bag made of a slit roll that is a film close to an end of a mill roll may experience S-shape curling due to moisture absorption. The reason for this is considered to be because the measure taken in Patent Literature 2 is a measure against S-shape curling phenomena that occur after bags are treated with boiling water, and is not a measure against S-shape curling phenomena due to moisture absorption.

Against the problem of S-shape curling phenomena due to moisture absorption, a packaging bag is proposed in which an acute angle formed by main orientation axis directions of biaxially stretched polyamide film layers on the outside and the inside of the packaging bag is not larger than 30° (see Patent Literature 3). However, in this method, although a bag made of a roll film having been slit from near the center of a mill roll has a small angle formed by the main orientation axis directions of the polyamide film layers on the outside and the inside and thus experiences few S-shape curling due to moisture absorption, a bag close to an end of the mill roll has a large angle formed by the main orientation axis directions of the polyamide films on the outside and the inside, and thus occurrence of S-shape curling due to moisture absorption cannot be reduced.

CITATION LIST

Patent Literature

[PTL 1] Japanese Patent No. 2623939
[PTL 2] Japanese Patent No. 3726304
[PTL 3] Japanese Laid-Open Patent Publication No. 2012-254804

SUMMARY OF THE INVENTION

Problems to be Solved by the Invention

The present invention is made in view of the above-described problems, and an object of the present invention is to provide a biaxially oriented polyamide film and a polyamide film mill roll that each experience little S-shape curling due to moisture absorption, even as a packaging bag made by using a film product that is close to an end of the mill roll.

Solution to the Problems

The inventors of the present application have conducted thorough research for solving the above-described problems, and as a result, have arrived at the present invention.

The present invention includes the following features.

1. A biaxially oriented polyamide film having at least one layer formed of a polyamide resin containing not lower than 60% by mass of poly(m-xylylene adipamide), wherein a molecular orientation angle of the film is not smaller than 20°, a strain at moisture absorption of the film is not higher than 1.3%, an impact strength of the film is not lower than 0.7 J/15 μm, and a heat shrinkage rate, after heating for ten minutes at 160° C., of the film is 0.6 to 3.0% in both an MD direction and a TD direction.

2. The biaxially oriented polyamide film according to the above 1., wherein an oxygen permeability of the biaxially oriented polyamide film is 60 to 140 ml/m²·day·MPa.

3. The biaxially oriented polyamide film according to the above 1. or 2., wherein a strain at thermal shrinkage, after heating for ten minutes at 160° C., of the film is not higher than 2.0%.

4. The biaxially oriented polyamide film according to any one of the above 1. to 3., wherein a layer formed of a polyamide resin containing not lower than 60% by mass of polyamide 6 is laminated on at least one surface of the layer formed of the polyamide resin containing not lower than 60% by mass of poly(m-xylylene adipamide).

5. The biaxially oriented polyamide film according to any one of the above 1. to 3., wherein a layer formed of a polyamide resin containing not lower than 60% by mass of polyamide 6 is laminated on each of both surfaces of the layer formed of the polyamide resin containing not lower than 60% by mass of poly(m-xylylene adipamide).

6. A polyamide film mill roll of a biaxially oriented polyamide film having at least one layer formed of a polyamide resin containing not lower than 60% by mass of poly(m-xylylene adipamide), wherein a molecular orientation angle of the film at each of positions that are inward by 300 mm from a right end and a left end in a transverse direction of the film mill roll is not smaller than 20°, an impact strength of the film at each position is not lower than 0.7 J/15 μm, a strain at moisture absorption of the film at each position is not higher than 1.3%, and a heat shrinkage rate, after heating for ten minutes at 160° C., of the film at each position is 0.6 to 3.0% in both an MD direction and a TD direction.

7. The polyamide film mill roll according to the above 6., wherein an oxygen permeability of the biaxially oriented polyamide film is 60 to 140 ml/m²·day·MPa.

8. The polyamide film mill roll according to the above 6. or 7., wherein a strain at thermal shrinkage, after heating for ten minutes at 160° C., of the film at each of the positions that are inward by 300 mm from the right end and the left end in the transverse direction of the polyamide film mill roll is not higher than 2.0%.

9. The polyamide film mill roll according to any one of the above 6. to 8., wherein, in the biaxially oriented polyamide film, a layer formed of a polyamide resin containing not lower than 60% by mass of polyamide 6 is laminated on at least one surface of the layer formed of the polyamide resin containing not lower than 60% by mass of poly(m-xylylene adipamide).

10. The polyamide film mill roll according to any one of the above 6. to 8., wherein, in the biaxially oriented polyamide film, a layer formed of a polyamide resin containing not lower than 60% by mass of polyamide 6 is laminated on each of both surfaces of the layer formed of the polyamide resin containing not lower than 60% by mass of poly(m-xylylene adipamide).

Advantageous Effects of the Invention

Each of the biaxially oriented polyamide film and the polyamide film mill roll of the present invention has excellent gas barrier properties, and has a low elongation anisotropy under high humidity and a low dimensional strain between before and after moisture absorption, even as a film portion that is close to an end of the mill roll. Consequently, S-shape curling of a processed bag can be reduced. Thus, when the bag is filled with content, a malfunction is less likely to occur at conveyance of the bag or the like, and the workability is good. Furthermore, a shrinkage strain at high temperature is also low, and thus shrinkage deformation after the bag is heat-sealed is also low. Therefore, the biaxially oriented polyamide film and the polyamide film mill roll of the present invention are suitable for use for various kinds of packaging purposes.

Figure 1:
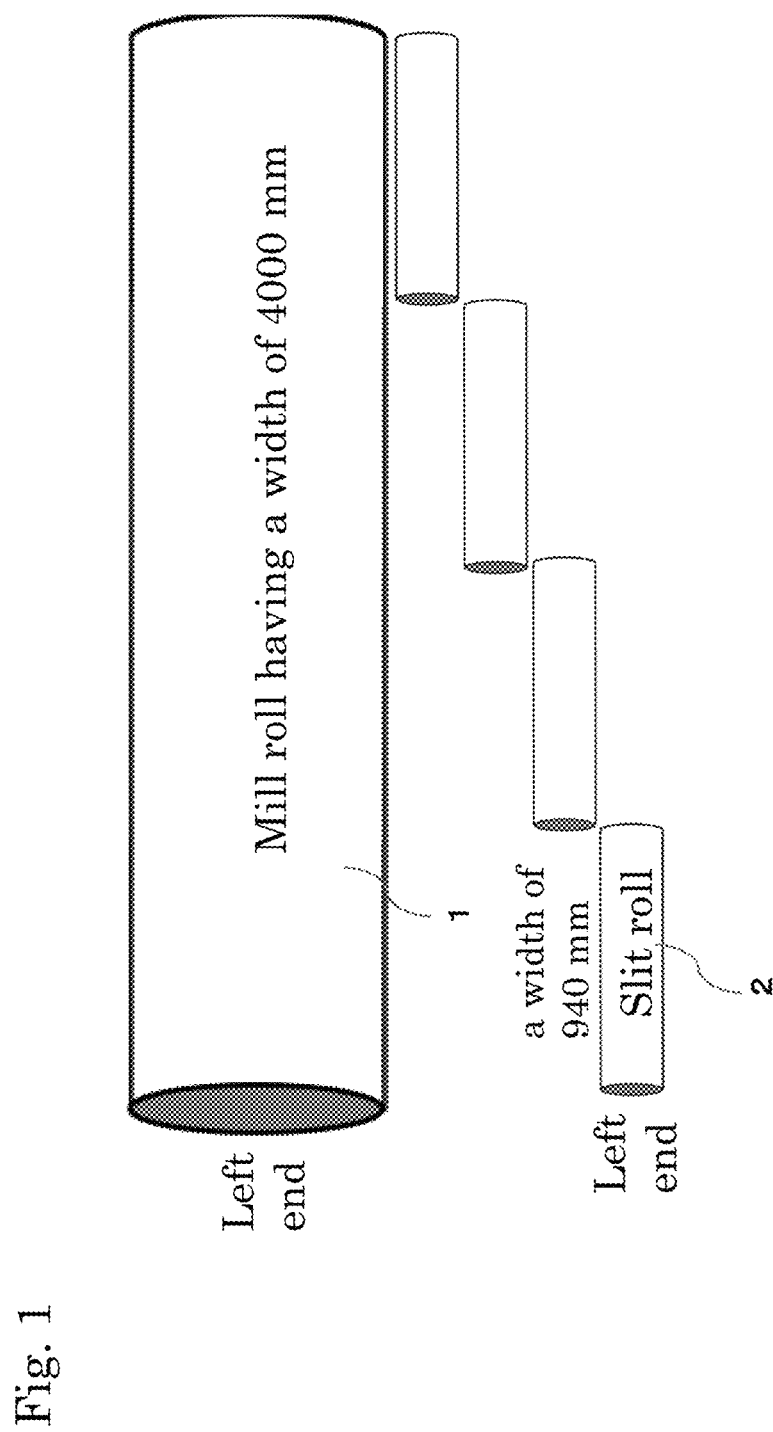
FIG. 1 is a schematic view of a slit roll used for evaluation of S-shape curling.
Figure 2:
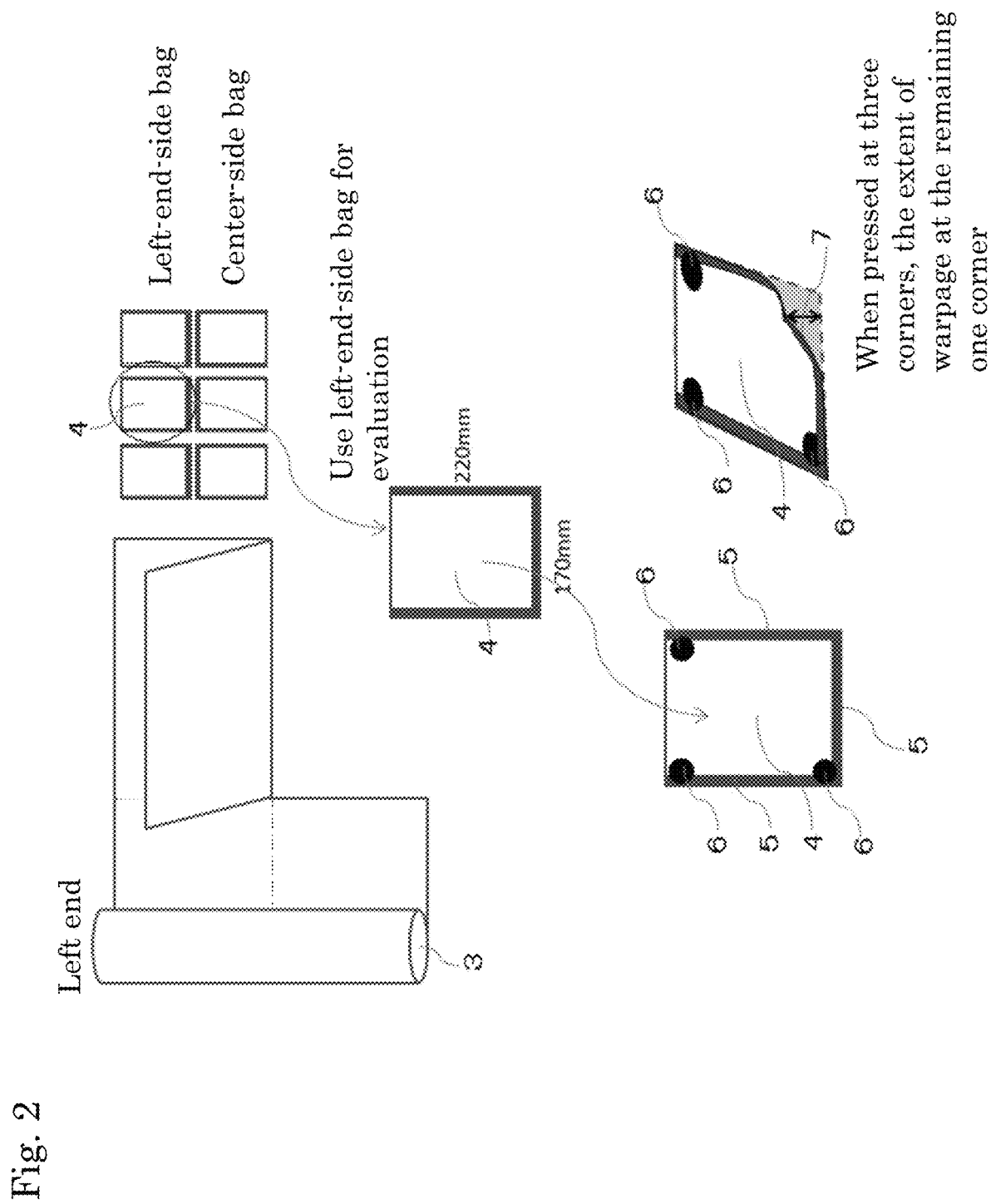
FIG. 2 is a schematic view for evaluation of S-shape curling of a bag.

DESCRIPTION OF THE REFERENCE CHARACTERS 1 mill roll of polyamide film
2 slit roll at left end
3 laminated roll obtained by laminating slit roll film at left end with sealant
4 three-side sealed bag at left end
5 heat-sealed portion of three-side sealed bag
6 weight for measuring warpage
7 height of warpage indicating extent of S-shape curling

DESCRIPTION OF EMBODIMENTS

Hereinafter, an embodiment of the present invention will be described in detail.

(Biaxially Oriented Poly Amide Film)

The biaxially oriented polyamide film of the present invention is a biaxially oriented polyamide film having at least one layer formed of a polyamide resin containing not lower than 60% by mass of poly(m-xylylene adipamide). In order to have excellent gas barrier properties, the layer is more preferably formed of a polyamide resin containing not lower than 80% by mass of poly(m-xylylene adipamide). The amount of poly(m-xylylene adipamide) is further preferably not lower than 90% by mass.

The polyamide MXD6 in the present invention is usually produced by polycondensation of metaxylylene diamine and adipic acid.

As the polyamide MXD6 in the present invention, ones commercially available from MITSUBISHI GAS CHEMICAL COMPANY, INC., etc., may be used.

The relative viscosity of the polyamide MXD6 in the present invention is preferably 1.8 to 4.5 and more preferably 2.6 to 3.6. If the relative viscosity is lower than 1.8, the impact resistance strength of the film is insufficient. If the relative viscosity is higher than 4.5, the load on an extruder increases, and it becomes difficult to obtain an unstretched sheet.

The biaxially oriented polyamide film of the present invention may contain, in addition to the polyamide MXD6 which is a main component, another thermoplastic resin for the purpose of improving stretchability, pinhole resistance, ease of cutting, and the like. In addition, the biaxially oriented polyamide film may contain small amounts of additives such as an anti-blocking agent, a lubricant, an antistatic agent, a thermal stabilizer, and a light resisting agent.

Examples of the other thermoplastic resin other than the polyamide MXD6 used in the present invention include homopolymers and copolymers such as polyamide-based resins, polyester-based resins, polyolefin-based resins, acrylic-based resins, polycarbonate-based resins, polyvinyl-based resins, and urethane-based resins. Polyamide-based resins are particularly preferable, and examples of polyamide-based resins include polyamide 6, polyamide 66, polyamide 610, polyamide 11, and polyamide 12.

The biaxially oriented polyamide film may contain a polyamide elastomer, a polyester elastomer, a polyolefin elastomer, or the like in order to improve pinhole resistance.

Examples of the anti-blocking agent used in the present invention include: inorganic fine particles of silica, kaolin, zeolite, and the like; and crosslinked polymeric fine particles of acryl, polystyrene, and the like. It is noted that, from the viewpoint of transparency and slipperiness, silica fine particles are suitable for use.

Examples of the lubricant used in the present invention include organic lubricants such as ethylene bis stearamide (EBS) having an effect of lowering surface energy. The lubricant may be contained within a range that does not cause any problem regarding adhesiveness and wettability.

Use of the anti-blocking agent and the lubricant together allows excellent slipperiness and transparency to be concurrently imparted to the film, and thus is preferable.

The biaxially oriented polyamide film of the present invention may be a single-layer film or a laminated film.

A biaxially oriented film containing polyamide MXD6 as a main component is superior in gas barrier properties to a biaxially oriented film containing polyamide 6 as a main component, but tends to have inferior impact resistance and pinhole resistance. Therefore, a film in which a layer containing polyamide 6 as a main component is laminated on a layer containing polyamide MXD6 as a main component has good gas barrier properties, impact resistance, and pinhole resistance, and thus is preferable.

As the configuration of the above laminated film, layer configurations such as two types and two layers (A/B), two types and three layers (A/B/A), three types and three layers (A/B/C), and super multi-layer (A/B/A/B . . . A/B) are conceivable. However, in order to increase the gas barrier properties, it is necessary to have at least one layer formed of a polyamide resin containing not lower than 60% by mass and more preferably not lower than 80% by mass of polyamide MXD6.

Examples of a preferable layer configuration include B/A/B, B/C/A/C/B, A/B, and B/A/C when a layer formed of a polyamide resin containing not lower than 60% by mass of polyamide MXD6 is defined as a layer A, and the other layers are defined as a layer B and a layer C. Among them, B/A/B, B/C/A/C/B, and B/A/C in each of which the layer A is disposed as a core layer are particularly preferable.

As a layer other than the layer formed of a polyamide resin containing not lower than 60% by mass of polyamide MXD6, a layer formed of a polyamide-based resin is preferable. As described above, a layer containing not lower than 60% by mass of polyamide 6 has excellent mechanical strength and adhesiveness to the layer containing polyamide MXD6 as a main component, and thus is particularly suitable.

The polyamide 6 used in the present invention is usually produced by ring-opening polymerization of ε-caprolactam. The polyamide 6 obtained by ring-opening polymerization is usually subjected to removal of the ε-caprolactam monomer by using hot water, then dried, and used.

The relative viscosity of the polyamide 6 is preferably 1.8 to 4.5 and more preferably 2.6 to 3.2. If the relative viscosity is lower than 1.8, the impact resistance strength of the film is insufficient. If the relative viscosity is higher than 4.5, the load on the extruder increases, and it becomes difficult to obtain an unstretched sheet.

Examples of the polyamide-based resin include polyamide 66, polyamide 610, polyamide 11, and polyamide 12 in addition to polyamide 6.

(Physical Properties of Biaxially Oriented Polyamide Film)

The biaxially oriented polyamide film of the present invention has a molecular orientation angle not smaller than 20° and a strain at moisture absorption not higher than 1.3%. The strain at moisture absorption is more preferably not higher than 1.1%. If the strain at moisture absorption is higher than 1.3%, S-shape curling due to moisture absorption of a bag having been made increases, and a problem arises.

The biaxially oriented polyamide film of the present invention is a film close to an end in the transverse direction of a mill roll, and thus has a molecular orientation angle not smaller than 20°. As the molecular orientation angle, the angle of the direction of a molecular chain orientation axis is measured with a molecular orientation angle measurement device MOA-6004 manufactured by Oji Scientific Instruments. The molecular orientation angle is a value that, with the angle of the machine direction of the film being defined as 0 degrees, is obtained as: the difference from 0 degrees when the above-described direction of the molecular orientation axis is smaller than 45 degrees relative to the machine direction; or the difference from 90 degrees when the direction of the molecular orientation axis is larger than 45 degrees relative to the machine direction. The larger the value is, the more intense a bowing phenomenon is. The value is larger at a position closer to an end of the mill roll relative to the center of the mill roll. Therefore, in the present invention, it is important to obtain a film having a low strain at moisture absorption even when the molecular orientation angle is large.

The biaxially oriented polyamide film at each of the positions that are inward by 300 mm from the right end and the left end in the transverse direction of the polyamide film mill roll of the present invention has a molecular orientation angle not smaller than 20°, an impact strength not lower than 0.7 J/15 μm, a strain at moisture absorption not higher than 1.3%, and a heat shrinkage rate, after heating for ten minutes at 160° C., of 0.6 to 3.0% in both an MD direction and a TD direction. The strain at moisture absorption is more preferably not higher than 1.1%. If the strain at moisture absorption is higher than 1.3%, S-shape curling due to moisture absorption of a bag having been made increases, and a problem arises.

The molecular orientation angle of the film at each of the positions that are inward by 300 mm from the right end and the left end in the transverse direction of the polyamide film mill roll of the present invention is not smaller than 20°. As the molecular orientation angle, the angle of the direction of a molecular chain orientation axis is measured with a molecular orientation angle measurement device MOA-6004 manufactured by Oji Scientific Instruments. The molecular orientation angle is a value that, with the angle of the machine direction of the film being defined as 0 degrees, is obtained as: the difference from 0 degrees when the above-described direction of the molecular orientation axis is smaller than 45 degrees relative to the machine direction; or the difference from 90 degrees when the direction of the molecular orientation axis is larger than 45 degrees relative to the machine direction. The larger the value is, the more intense a bowing phenomenon is. The value is larger at a position closer to an end of the mill roll relative to the center of the mill roll. Therefore, in the present invention, it is important that the strain at moisture absorption is low even when the film at the end of a mill roll having a larger molecular orientation angle is used.

The impact strength of the biaxially oriented polyamide film of the present invention is not lower than 0.7 J/15 μm. The impact strength is preferably not lower than 1.0 J/15 μm. If the impact strength is lower than 0.7 J/15 μm, a packaging bag used for packaging may be torn due to impact during transportation.

A larger impact strength is less likely to result in tearing of the packaging bag, and thus is preferable. The impact strength of 2.0 J/15 μm is sufficient for normal use.

The heat shrinkage rate, after heating for ten minutes at 160° C., of the biaxially oriented polyamide film of the present invention is within a range of 0.6 to 3.0% both in the MD direction (machine direction) and the TD direction (transverse direction). This heat shrinkage rate is preferably 0.6 to 2.0%. A heat shrinkage rate higher than 3.0% causes the film to shrink and have a poor appearance at the time of printing processing, lamination processing, or bag-making processing, and thus is not preferable. Meanwhile, a heat shrinkage rate lower than 0.6 may lead to an increase in the strain at moisture absorption.

The biaxially oriented polyamide film of the present invention preferably has a molecular orientation angle not smaller than 20° and a strain at thermal shrinkage not higher than 2.0%. The strain at thermal shrinkage is more preferably not higher than 1.8%. If the strain at thermal shrinkage is higher than 2.0%, when a bag is heat-sealed, a heat-sealed portion may experience shrinkage deformation, resulting in a poor appearance. In addition, a sufficient effect of suppressing S-shape curling may not be obtained.

Moreover, the oxygen permeability of the biaxially oriented polyamide film of the present invention is preferably 60 to 140 ml/m²·day·MPa in order to suppress deterioration of the contents when used for food packaging and the like. If the oxygen permeability is higher than 140 ml/m²·day·MPa, the gas barrier effect when made into a packaging bag cannot be expected. If the oxygen permeability is lower, the gas barrier effect when made into a packaging bag can be expected. However, in order to make the oxygen permeability lower than 60 ml/m²·day·MPa, it is necessary to further laminate a gas barrier layer made of polyvinylidene chloride or the like or a gas barrier layer that is an inorganic thin film made of silica or alumina, on the film of the present invention.

(Method for Manufacturing Film)

Each of the biaxially oriented polyamide film and the polyamide film mill roll of the present invention is obtained by, for example, performing preparatory longitudinal stretch in a low ratio on an unstretched polyamide film first in the machine direction, then performing main longitudinal stretch in the machine direction in two or more stages such that the total longitudinal stretch ratio is set to be not lower than 3 times, then performing transverse stretch, heat setting treatment, and thermal relaxation treatment, then trimming clip-held portions, winding the polyamide film as a mill roll, and then slitting the mill roll to have a width for processing.

Although the width of the mill roll of the biaxially oriented polyamide film of the present invention is not particularly limited, the width is ordinarily 3000 to 8000 mm. Although the winding length of the polyamide film mill roll is not particularly limited, the winding length is ordinarily 5000 to 70000 m.

The width of a roll obtained by the slitting for processing is 400 to 3000 mm, and the winding length of the roll is 3000 to 10000 m.

In association with increase in the sizes of films for aluminum vacuum vapor deposition machines and the like, the sizes of slit rolls have also been increased in recent years. Thus, the slit roll may have a width and a winding length larger than the aforementioned width and winding length.

The biaxially oriented polyamide film of the present invention is a film close to the end of the mill roll, and thus has a molecular orientation angle not smaller than 20°.

In addition, the molecular orientation angle of the film at each of the positions that are inward by 300 mm from the right end and the left end in the transverse direction of the polyamide film mill roll is not smaller than 20°.

The biaxially oriented polyamide film of the present invention tends to, at a position thereof closer to the end of the mill roll, have a larger molecular orientation angle and also have a higher strain at moisture absorption and a higher strain at thermal shrinkage.

When the biaxially oriented polyamide film, at the right end or the left end of a slit film roll, has a molecular orientation angle not smaller than 20° and a strain at moisture absorption not higher than 1.3%, occurrence of S-shape curling due to moisture absorption of a bag obtained by processing can be suppressed.

Moreover, even when the molecular orientation angle of the film at each of the positions that are inward by 300 mm from the right end and the left end in the transverse direction of the polyamide film mill roll is not smaller than 20°, if the strain at moisture absorption is not higher than 1.3%, occurrence of S-shape curling due to moisture absorption of a bag obtained by processing the slit film roll can be suppressed.

A preferable method for obtaining the biaxially oriented polyamide film of the present invention will be described more in detail.

Regarding the biaxially oriented polyamide film of the present invention, it is preferable that, for example, an unstretched polyamide film is subjected to preparatory longitudinal stretch in a low ratio in the machine direction, then subjected to main longitudinal stretch in a high ratio in the machine direction in two or more stages, subsequently subjected to transverse stretch, and further subjected to heat setting treatment and heat relaxation treatment, thereby forming a biaxially oriented polyamide film which is wound to obtain a mill roll.

The above-described preparatory longitudinal stretch may be performed in one stage or in two or more stages. It is noted that the total stretch ratio obtained by multiplying the stretch ratios in the preparatory longitudinal stretches is preferably 1.005 to 1.15 times.

The main longitudinal stretch performed subsequently to the preparatory longitudinal stretch preferably involves stretch in the machine direction in two or more stages. The ratio in the first stage of main longitudinal stretch is preferably 1.1 to 2.9 times. The ratio in the second or subsequent stage of main longitudinal stretch is preferably set such that the total longitudinal stretch ratio obtained by multiplying the stretch ratios including the preparatory longitudinal stretch ratio is set to 2.8 to 5.0 times. The total longitudinal stretch ratio is more preferably 3.0 to 3.5 times.

An example of the method for obtaining the biaxially oriented polyamide film of the present invention will be described in more detail.

First, a raw material containing the above-described polyamide MXD6 and polyamide 6 as a main component is dried, then melt-extruded with an extruder, cast on a rotating drum from a T-die, and rapidly cooled and solidified, thereby obtaining an unstretched polyamide film.

The unstretched film is subjected to the preparatory longitudinal stretch of 1.005 to 1.15 times at a temperature not lower than [glass transition temperature (hereinafter, abbreviated as Tg)+20]° C. and not higher than [low-temperature crystallization temperature (hereinafter, abbreviated as Tc+20]° C.

Here, Tg and Tc are values obtained through measurement by the method described in EXAMPLES.

Performing the preparatory longitudinal stretch at a temperature lower than (Tg+20)° C. makes it more likely that necking occurs and unevenness in the thickness increases. Meanwhile, performing the stretch at a temperature higher than (Tc+20)° C. causes thermal crystallization to progress and makes it more likely that rupture occurs by transverse stretch, and thus is not preferable. A more preferable stretch temperature is (Tg+30)° C. to (Tc+10)° C. If the stretch ratio in the preparatory longitudinal stretch is excessively low, an effect of improving the strain at moisture absorption is less likely to be obtained. In contrast, if the stretch ratio is excessively high, oriented crystallization excessively progresses, and a stretching stress in the main longitudinal stretch described later becomes excessively high, whereby rupture is more likely to occur at the time of performing the main longitudinal stretch or the transverse stretch. From this viewpoint, the stretch ratio in the preparatory stretch is preferably 1.005 to 1.15 times. A more preferable stretch ratio is 1.01 to 1.1 times. Although the preparatory longitudinal stretch may be performed in one stage or in multiple stages, the total preparatory longitudinal stretch ratio is preferably set to fall within the above-described range.

For the preparatory longitudinal stretch, publicly-known longitudinal stretch methods such as thermal roll stretch and infrared radiation stretch can be employed.

It is preferable to, after performing preparatory stretch in the machine direction, subsequently perform main stretch in the machine direction (abbreviated as main longitudinal stretch) in multiple stages. The first stage of main longitudinal stretch is preferably performed such that the longitudinal stretch ratio is set to 1.1 to 2.9 times. The stretch ratio is more preferably 1.5 to 2.5 times. If the stretch ratio in the first stage of main longitudinal stretch is excessively low, a stretching effect is not obtained. In contrast, if the stretch ratio is excessively high, oriented crystallization excessively progresses, and a stretching stress in the second stage of main longitudinal stretch becomes excessively high, whereby rupture is more likely to occur in the longitudinal stretch or the transverse stretch.

The stretch temperature in the first stage of main longitudinal stretch is preferably (Tg+20)° C. to (Tc+20)° C.

If the stretch temperature is lower than (Tg+20)° C., the stretching stress becomes excessively high, and rupture is more likely to occur in the transverse stretch. Meanwhile, if the stretch temperature is higher than (Tc+20)° C., unevenness in the thickness increases. The stretch temperature is more preferably (Tg+30)° C. to (Tc+10)° C. For the first stage of main longitudinal stretch, publicly-known longitudinal stretch methods such as thermal roll stretch and infrared radiation stretch can be employed.

After the first stage of main longitudinal stretch, the second stage of main longitudinal stretch is performed subsequently. The second stage of main longitudinal stretch is preferably performed by a thermal roll stretch method. In the second stage of main longitudinal stretch, it is preferable to use a ceramic roll having a surface roughness Ra not larger than 0.2 μm. Use of a roll having an Ra larger than 0.2 μm leads to performing of the stretch in a state where the film slips on the roll. Thus, the said use causes a scratch to be generated on the surface of the film and is not preferable. In addition, the said use causes the starting points for the stretch on the roll to become uneven in the transverse direction or otherwise causes variation among the starting points for the stretch. Thus, the said use causes unevenness in the thickness and is not preferable. That is, in the second stage of main longitudinal stretch, it is preferable that, regardless of the thickness profile in the transverse direction of the film having been subjected to the first stage of main longitudinal stretch, the film is stretched in a state of being linearly adhered in the transverse direction on the roll and is heated and stretched evenly in the transverse direction. Here, Ra refers to a center line average roughness which is the average height (unit=μm) of the projections and recesses and which is a value defined in JIS B 0601.

Regarding the stretch ratio in the second stage of main longitudinal stretch, the second stage of main longitudinal stretch is performed such that the total longitudinal stretch ratio obtained by multiplying the preparatory longitudinal stretch ratios and the main longitudinal stretch ratios is set to be not lower than 2.8 times. If the total longitudinal stretch ratio is lower than 2.8 times, although variations in the physical properties in the transverse direction of the biaxially orientated film become small, the strength thereof in the machine direction decreases. Meanwhile, if the total longitudinal stretch ratio becomes excessively high, there may also be a case where an effect of decreasing the variations in the physical properties in the transverse direction of the biaxially orientated film is not exhibited. Considering this, the total longitudinal stretch ratio is preferably 3.0 to 3.8 times and more preferably 3.0 to 3.5 times. The stretch temperature in the second stage of longitudinal stretch is also (Tg+20)° C. to (Tc+20)° C. If the stretch temperature is lower than (Tg+20)° C., the stretching stress becomes high, and rupture is more likely to occur in the transverse stretch. Meanwhile, if the stretch temperature is higher than (Tc+20)° C., unevenness in the thickness increases. The stretch temperature is more preferably (Tg+30)° C. to (Tc+10)° C.

The machine direction uniaxially orientated film that has been thus obtained is stretched in the transverse direction by using a tenter.

If the transverse stretch temperature is excessively low, the transverse stretchability may deteriorate (rupture may occur). Meanwhile, if the transverse stretch temperature is excessively high, the unevenness in the thickness tends to increase. From such viewpoints, the transverse stretch temperature is preferably 100 to 200° C. and more preferably 120 to 160° C. From the viewpoint of ensuring the strength in the transverse direction, the stretch ratio is preferably 3.0 to 5.0 times and further preferably 3.5 to 4.5 times.

The biaxially oriented polyamide film that has been thus stretched is subjected to heat setting treatment and thermal relaxation treatment, clip-held portions thereof are cut off, and then the biaxially oriented polyamide film is wound as a mill roll.

The heat setting temperature is preferably within a range of 190° C. to 230° C. and further preferably 200° C. to 220° C.

The thermal relaxation temperature is preferably within a range of 190° C. to 230° C. and further preferably 200° C. to 220° C. The thermal relaxation rate is preferably 0 to 10% and further preferably 2 to 7%.

As described above, the biaxially oriented polyamide film of the present invention is obtained by, for example, performing the preparatory longitudinal stretch and the main longitudinal stretch separately as the longitudinal stretch, performing the main longitudinal stretch in two or more stages with use of a ceramic roll having a surface roughness Ra not larger than 0.2 μm as a stretch roll for the second stage of main longitudinal stretch, subsequently performing stretch in the transverse direction, performing heat setting treatment and thermal relaxation treatment, cutting off clip-held portions, and performing winding as a mill roll.

The biaxially oriented polyamide film of the present invention can also be further subjected to heat setting treatment, heat relaxation treatment, humidity control treatment, and the like in order to further improve the dimensional stability thereof. In addition, the biaxially oriented polyamide film can also be subjected to corona treatment, coating treatment, flame treatment, and the like in order to further improve the adhesiveness and the wettability thereof.

The above-described heat setting treatment, heat relaxation treatment, humidity control treatment, corona treatment, coating treatment, flame treatment, and the like can be performed also during the manufacturing process for the biaxially oriented polyamide film. Alternatively, these treatments can be performed also when a mill roll or a slit roll is wound.

EXAMPLES

Hereinafter, the present invention will be more specifically described by means of examples. The present invention is not limited by the following examples. The present invention can be carried out with appropriate modifications being made within the scope of the gist described above and below. It is noted that raw materials used, film physical properties, and characteristics evaluation methods are as follows. Measurement was performed in a measuring room in an environment at 23° C. and a relative humidity of 65%, unless otherwise specified.

<Raw Materials of Biaxially Oriented Polyamide Film>
[Polyamide MXD6]
A polyamide MXD6 having a RV of 2.2 and a melting point (Tm) of 238° C. was used.
[Polyamide 6]
A polyamide 6 having a RV of 2.9 and a melting point (Tm) of 220° C. was used.
[Masterbatch of Silica Fine Particles and Ethylene Bis Stearamide]
93.5% by mass of the above-described polyamide 6, 5% by mass of porous silica fine particles (weight-average particle diameter=4 μm, pore volume=1.6 ml/g), and 1.5% by mass of ethylene bis stearamide (Light Amide WE-183 manufactured by KYOEISHA CHEMICAL CO., LTD.) were mixed, and the mixture was melted, kneaded, and extruded with a twin-screw extruder and cut into a pellet form, whereby a masterbatch was obtained.

<Measurement Methods and Evaluation Methods>
[Relative Viscosity]
Polyamide solutions obtained by dissolving 0.25 g of the above-described raw material polyamides in 25-ml measuring flasks with use of 96% sulfuric acid such that the polyamides had a concentration of 1.0 g/dl, were each measured for the relative viscosity thereof at 20° C.

[Tg, Tc, and Tm]
A melting peak temperature Tm was measured as a melting point according to JIS K7121 by using DSC-60 type differential scanning calorimeter manufactured by Shimadzu Corporation, in a process of increasing, in a nitrogen atmosphere, the temperature of a pirn containing 10 mg of an unstretched polyamide film from 30° C. to 280° C. at a temperature increase rate of 10° C./minute. When the temperature reached 280° C., the pirn containing the sample was immersed in liquid nitrogen, to be rapidly cooled. Thereafter, the temperature of the pirn was increased from −10° C. to 280° C. at a temperature increase rate of 20° C./minute, and a glass transition initiation temperature Tg and a cool crystallization peak temperature Tc extrapolated in the temperature increase process were measured.

[Molecular Orientation Angle]
Each mill roll was slit so that, with a 150-mm portion from the left-side end of the mill roll being an ear, a slit roll having a width of 940 mm was made on the inner side of the ear. Square-shaped film samples in each of which one side is 100 mm were taken, with the centers of the squares being the positions that were inward by 150 mm from the right end and the left end in the transverse direction of the slit roll. The molecular orientation angle (the angle of the direction of a molecular orientation axis) of each film sample was measured with a molecular orientation angle measurement device (MOA-6004) manufactured by Oji Scientific Instruments. The above-described molecular orientation angle was, with the angle of the machine direction of each film being defined as 0 degrees, obtained as: the difference from 0 degrees if the above-described direction of the molecular orientation axis was smaller than 45 degrees relative to the machine direction; or the difference from 90 degrees if the direction of the molecular orientation axis was larger than 45 degrees relative to the machine direction. The larger value is indicated as a molecular orientation angle in Table 1 and Table 3. In each of the examples and the comparative examples, a value at the left end close to the end of the mill roll was larger.

[Film Thickness]

A film was cut into ten equal parts in the transverse direction thereof (as for a narrow film, the film was cut into equal parts such that a width that allows a measurement of a thickness can be ensured). The 10 films were stacked on top of each other, cut into a 100 mm film in the machine direction, and conditioned in an environment at a temperature of 23° C. and a relative humidity of 65% for not less than 2 hours. A thickness at the center of each sample was measured with a thickness measurement device manufactured by TESTER SANGYO CO., LTD., and the average value of the measurements was used as a thickness.

[Impact Strength]

Each mill roll was slit so that, with a 150-mm portion from the left-side end of the mill roll being an ear, a slit roll having a width of 940 mm was made on the inner side of the ear. Measurement samples were cut out, with the centers thereof being the positions that were inward by 150 mm from the right end and the left end in the transverse direction of the slit roll. The thickness of each measurement sample was measured with a thickness measurement device manufactured by TESTER SANGYO CO., LTD. Thereafter, the impact strength of the film was measured with a hemispheric impact head having a diameter of ½ inches by using a film impact tester manufactured by Toyo Seiki Seisaku-sho, Ltd. The obtained values were each converted to an impact strength per 15 μm with the following expression. Table 1 and Table 3 indicate a value at the left end side at which the molecular orientation angle was larger.

Impact strength (J/15 μm)=observed impact strength (J)×15 μm/thickness (μm)

Film samples were obtained, with the centers of the film samples being the positions that were inward by 300 mm from the right end and the left end in the transverse direction of the mill roll. In the same manner as described above, the thickness of each sample was measured with a thickness measurement device manufactured by TESTER SANGYO CO., LTD., and then the impact strength of each sample was measured with a hemispheric impact head having a diameter of ½ inches by using a film impact tester manufactured by Toyo Seiki Seisaku-sho, Ltd. The obtained values were converted to an impact strength per 15 μm at each of the right end and the left end with the above expression. Table 2 and Table 4 indicate an average value since the difference between the right end and the left end was 5% or less.

[Strain at Moisture Absorption]

Each mill roll was slit so that, with a 150-mm portion from the left-side end of the mill roll being an ear, a slit roll having a width of 940 mm was made on the inner side of the ear. Square-shaped measurement samples in each of which one side is 210 mm were obtained, with the centers of the squares being the positions that were inward by 150 mm from the right end and the left end in the transverse direction of the slit roll. A circle having a diameter of 200 mm was drawn around the center of each sample. With the MD direction being defined as 0°, straight lines passing through the center of the circle were drawn in the direction at 45° and the direction at 135°. Then, the sample was left in an atmosphere of 30° C. and 80% RH for at least two hours, and then the diameters in the respective directions were measured to obtain lengths at high humidity. Thereafter, the sample was left in a room at 20° C. and 40% RH for at least two hours. Then, the lengths of the straight lines drawn in the respective diameter directions were measured again to obtain lengths at low humidity, and elongations at moisture absorption were calculated with the following expression. Thereafter, the absolute value (%) of the difference between the elongations at moisture absorption in the direction at 45° and the direction at 135° was calculated as a strain at moisture absorption, and the larger absolute value is indicated as a strain at moisture absorption in Table 1 and Table 3. In each of the examples and the comparative examples, the value at the left end was larger in the same manner as the molecular orientation angle.

Elongation at moisture absorption=[(length at high humidity−length at low humidity)/length at low humidity]×100(%)

Square-shaped film samples in each of which one side is 210 mm were obtained, with the centers of the squares being the positions that were inward by 300 mm from the right end and the left end in the transverse direction of the mill roll. In the same manner as described above, a circle having a diameter of 200 mm was drawn around the center of each sample. With the MD direction being defined as 0°, straight lines passing through the center of the circle were drawn in the direction at 45° and the direction at 135°. Then, the sample was left in an atmosphere of 30° C. and 80% RH for at least two hours, and then the diameters in the respective directions were measured to obtain lengths at high humidity. Thereafter, the sample was left in a room at 20° C. and 40% RH for at least two hours. Then, the lengths of the straight lines drawn in the respective diameter directions were measured again to obtain lengths at low humidity, and elongations at moisture absorption were calculated with the above expression. Thereafter, the absolute value (%) of the difference between the elongations at moisture absorption in the direction at 45° and the direction at 135° was calculated as a strain at moisture absorption at each of the right end and the left end, and is indicated in Table 2 and Table 4.

[Heat Shrinkage Rate]

Each mill roll was slit so that, with a 150-mm portion from the left-side end of the mill roll being an ear, a slit roll having a width of 940 mm was made on the inner side of the ear. Measurement samples were cut out, with the centers thereof being the positions that were inward by 150 mm from the right end and the left end in the transverse direction of the slit roll, and the heat shrinkage rates of the measurement samples were measured with the following expression according to the dimensional change testing method described in JIS C2318, except that the test temperature was set to 160° C. and the heating time was set to ten minutes. Table 1 and Table 3 indicate a value on the left end side at which the molecular orientation angle was larger.

Heat shrinkage rate=[(length before treatment−length after treatment)/length before treatment]×100 (%)

Films were cut out at the positions that were inward by 300 mm from the right end and the left end in the transverse direction of the mill roll, and the heat shrinkage rates at the right end and the left end were measured with the above expression according to the dimensional change testing method described in JIS C2318, except that the test temperature was set to 160° C. and the heating time was set to ten minutes, in the same manner as described above, and are indicated in Table 2 and Table 4.

[Strain at Thermal Shrinkage]

Each mill roll was slit so that, with a 150-mm portion from the left-side end of the mill roll being an ear, a slit roll having a width of 940 mm was made on the inner side of the ear. Square-shaped measurement samples in each of which one side is 210 mm were obtained, with the centers of the squares being the positions that were inward by 150 mm from the right end and the left end in the transverse direction of the slit roll. The films were left in an atmosphere of 23° C. and 65% RH for at least two hours. Then, a circle having a diameter of 200 mm was drawn around the center of each sample. With the MD direction (machine direction) being defined as 0°, straight lines passing through the center of the circle were drawn in the direction at 45° and the direction at 135°. The diameters in the respective directions were measured to obtain lengths before treatment. Then, the sample was heated at a test temperature of 160° C. for ten minutes, then taken out, and left in an atmosphere of 23° C. and 65% RH for at least two hours. Then, the lengths of the straight lines drawn in the respective diameter directions were measured again to obtain lengths after treatment, and heat shrinkage rates were calculated with the following expression. Thereafter, the absolute value (%) of the difference between the heat shrinkage rates in the direction at 45° and the direction at 135° was calculated as a strain at thermal shrinkage, and the larger absolute value is indicated as a strain at thermal shrinkage in Table 1 and Table 3. In each of the examples and the comparative examples, the value at the left end was larger in the same manner as the molecular orientation angle.

Heat shrinkage rate=[(length before treatment−length after treatment)/length before treatment]×100 (%)

Square-shaped film samples in each of which one side is 210 mm were obtained, with the centers of the squares being the positions that were inward by 300 mm from the right end and the left end in the transverse direction of the mill roll. The films were left in an atmosphere of 23° C. and 65% RH for at least two hours. Then, in the same manner as described above, a circle having a diameter of 200 mm was drawn around the center of each sample. With the MD direction (machine direction) being defined as 0°, straight lines passing through the center of the circle were drawn in the direction at 45° and the direction at 135°. The diameters in the respective directions were measured to obtain lengths before treatment. Then, the sample was heated at a test temperature of 160° C. for ten minutes, then taken out, and left in an atmosphere of 23° C. and 65% RH for at least two hours. Then, the lengths of the straight lines drawn in the respective diameter directions were measured again to obtain lengths after treatment, and heat shrinkage rates were calculated with the above expression. Thereafter, the absolute value (%) of the difference between the heat shrinkage rates in the direction at 45° and the direction at 135° was calculated as a strain at thermal shrinkage at each of the right end and the left end, and is indicated in Table 2 and Table 4.

[S-Shape Curling]

Each mill roll was slit so that, with a 150-mm portion from the left-side end of the mill roll being an ear, a slit roll having a width of 940 mm was made on the inner side of the ear. A polyester-based adhesive [an adhesive (solid content concentration: 23%) obtained by mixing TM-569 (product name) and CAT-10L (product name) manufactured by Toyo-Morton, Ltd., in a weight ratio of 7.2/1] was coated on a corona-treated surface of the polyamide film of the slit roll such that a resin solid content after drying was set to 3.2 g/m². Then, 40 μm of a linear low-density polyethylene film (L-LDPE film: manufactured by TOYOBO CO., LTD., LIX (registered trademark) L4102) was dry-laminated, and aging was performed in an environment of 40° C. for two days, whereby a laminated film was obtained.

By using a three-side sealed bag making machine manufactured by NISHIBE KIKAI CO., LTD., the laminated film wound as a laminated film roll as described above was folded in half at the center thereof parallelly to the winding length direction and then cut, and the halves were superimposed on each other such that the polyamide film faces outward. Then, the laminated film was thermally sealed in the machine direction at 155° C., by a width of 10 mm at both ends thereof and by a width of 20 mm at a center portion thereof. Further, the laminated film was intermittently thermally sealed in a direction perpendicular to the machine direction at 180° C. at intervals of 170 mm, by a width of 20 mm. This laminated film was cut, in the winding length direction, at the center of the center sealed portion thereof and at both edge portions thereof such that the width of each bag was set to 220 mm. Then, the laminated film was cut, in the direction perpendicular to the winding length direction, at the center of each sealed portion, whereby three-side sealed bags (seal width: 10 mm) were made. Ten left-end-side bags out of these three-side sealed bags having been made were prepared as samples. Subsequently, the ten three-side sealed bags were treated at 30° C. and 60% RH for 24 hours and then retained in an atmosphere of 20° C. and 20% RH for 24 hours. Each of the resultant three-side sealed bags was pressed at three corners thereof, i.e., two corners on the opening portion and one corner on a sealed portion, out of four corners, and the extent of warpage (S-shape curling) at the remaining one corner was evaluated as follows.

Score 10: lower than 40 mm
Score 5: not lower than 40 and lower than 50 mm
Score 1: not lower than 50 mm If the average of scores of the 10-score evaluations was a score not lower than 7, an evaluation of "A" was given. If this average is a score of 3 to 7, an evaluation of "B" was given. If this average is a score lower than 3, an evaluation of "C" was given.

Bags evaluated as "C" which scores lower than 3 suffer drawbacks of errors in boxing of the bags or filling machine conveyance, and thus are problematic. If the score is not lower than 3, the drawbacks are in a permissible range.

[Water-Resistant Lamination Strength (Lamination Strength Under Condition of Water Adhesion)]

Each laminated film having been made for evaluation of S-shape curling was cut in a strip shape with a width of 15 mm and a length of 200 mm. One end of the laminated film was peeled at the interface between the biaxially stretched polyamide film and the linear low-density polyethylene film. A lamination strength was measured by using AUTOGRAPH (manufactured by Shimadzu Corporation) under a condition of a temperature of 23° C., a relative humidity of 50%, a tensile speed of 200 mm/minute, and a peeling angle of 90° while water was being dropped with a dropper to the peeling interface of the above-described laminated film having a strip shape. The measurement was performed three times, and evaluation was made on the basis of the average value of the lamination strengths.

Example 1

A melted film was extruded at a temperature of 260° C. by using a co-extruding T-die facility for two types and three layers, and was electrostatically brought into close contact on a metal roll, which had been cooled to 30° C., by application of DC high voltage to cool and solidify the film, whereby an unstretched sheet having the following configuration was obtained.

The configuration was a layer B/layer A/layer B configuration, the total thickness of the unstretched sheet was 200 µm, and the ratio of the thickness of the layer A to the total thickness was 20%.

Composition forming the layer A:

Raw materials were blended such that 90% by mass of polyamide MXD6 "trade name MX Nylon S6007, manufactured by MITSUBISHI GAS CHEMICAL COMPANY, INC." and 10% by mass of nylon 6 were contained.

Composition forming the layer B:

Raw materials were blended such that 85% by mass of the polyamide 6, 3% by mass of the polyamide MXD6, and 12% by mass of the masterbatch of silica fine particles and ethylene bis stearamide (polyamide 6 is a matrix), were contained. The unstretched film had a Tg of 41° C. and a Tc of 69° C.

By using a roll stretch machine, the unstretched film was subjected to a first stage of preparatory longitudinal stretch of 1.03 times at a stretch temperature of 80° C., then subjected to a second stage of preparatory longitudinal stretch of 1.03 times at a stretch temperature of 80° C., then subjected to a first stage of main longitudinal stretch of 2.1 times at 85° C., and further subjected to a second stage of main longitudinal stretch of 1.5 times at a stretch temperature of 70° C.

Then, the longitudinally stretched film was continuously guided to a tenter and subjected to transverse stretch of 4.0 times at 130° C. Then, the resultant film was subjected to heat setting treatment at 210° C. and further subjected to 5.0% relaxation treatment at 210° C. in the transverse direction. The film was successively cooled at 100° C., and corona treatment was performed on one surface thereof. Then, tenter-clip-held portions of both ends of the film were each trimmed by a width of 150 mm, whereby a mill roll of a biaxially oriented polyamide film having a thickness of 15 µm and a width of 6000 mm was obtained. The characteristic evaluation results of the film and the mill roll are indicated in Table 1 and Table 2.

Example 2

A mill roll of a biaxially oriented poly-amide film was obtained in the same manner as Example 1, except that the temperatures and the ratios in the preparatory longitudinal stretch and the ratios in the main longitudinal stretch were changed as indicated in Table 1 and Table 2. The characteristic evaluation results of the film and the mill roll are indicated in Table 1 and Table 2.

Example 3

A mill roll of a biaxially oriented polyamide film was obtained in the same manner as in Example 2, except that, as indicated in Table 1 and Table 2, one stage of preparatory longitudinal stretch was performed at a ratio that was set as in Table 1 and Table 2, the ratio in the second stage of main longitudinal stretch was changed, and the thickness of the unstretched film was changed to 180 µm. The characteristic evaluation results of the film and the mill roll are indicated in Table 1 and Table 2.

Example 4

A mill roll of a biaxially oriented polyamide film was obtained in the same manner as in Example 3, except that the film manufacturing device was changed to one having a mill roll width of 4000 mm. The characteristic evaluation results of the film and the mill roll are indicated in Table 1 and Table 2.

Comparative Example 1 to Comparative Example 6

Mill rolls of biaxially oriented polyamide films were obtained in the same manner as in the examples, except that: no preparatory longitudinal stretch was performed as indicated in Table 1 and Table 2; and, as the main longitudinal stretch, two stages of stretches were performed at the temperatures and the ratios indicated in Table 1 and Table 2. The characteristic evaluation results of the films and the mill rolls are indicated in Table 1 and Table 2.

Comparative Example 7

A mill roll of a biaxially oriented polyamide film was obtained in the same manner as in the examples, except that: no preparatory longitudinal stretch was performed as indicated in Table 1 and Table 2; and, as the main longitudinal stretch, one stage of stretch was performed at the temperature and the ratio indicated in Table 1 and Table 2. The characteristic evaluation results of the film and the mill roll are indicated in Table 1 and Table 2.

TABLE 1

| | | | Example | | | | Comparative Example | | | | | | |
|---|---|---|---|---|---|---|---|---|---|---|---|---|---|
| | | | 1 | 2 | 3 | 4 | 1 | 2 | 3 | 4 | 5 | 6 | 7 |
| Preparatory longitudinal stretch first stage | Temperature | ° C. | 80 | 85 | 85 | 85 | | | | | | | |
| | Ratio | — | 1.03 | 1.02 | 1.07 | 1.07 | | | | | | | |
| Preparatory longitudinal stretch second stage | Temperature | ° C. | 80 | 85 | | | | | | | | | |
| | Ratio | — | 1.03 | 1.02 | | | | | | | | | |
| Main longitudinal stretch first stage | Temperature | ° C. | 85 | 85 | 85 | 85 | 75 | 85 | 80 | 80 | 70 | 80 | 70 |
| | Ratio | — | 2.1 | 2.0 | 2.0 | 2.0 | 1.7 | 2.1 | 1.7 | 1.7 | 1.7 | 1.7 | 3.3 |
| Main longitudinal stretch second stage | Temperature | ° C. | 75 | 75 | 75 | 75 | 70 | 70 | 70 | 70 | 70 | 65 | |
| | Ratio | — | 1.5 | 1.6 | 1.4 | 1.4 | 1.9 | 1.6 | 1.8 | 1.8 | 1.9 | 1.5 | |
| Total ratio of longitudinal stretch | | — | 3.3 | 3.3 | 3.1 | 3.1 | 3.3 | 3.3 | 3.1 | 3.1 | 3.3 | 2.6 | 3.3 |
| Transverse stretch | Temperature | ° C. | 120 | 120 | 120 | 120 | 120 | 120 | 120 | 120 | 120 | 120 | 120 |
| | Ratio | — | 3.7 | 3.7 | 3.7 | 3.7 | 3.7 | 3.7 | 3.7 | 3.7 | 4.0 | 4.0 | 4.0 |
| Heat setting temperature | | ° C. | 215 | 215 | 215 | 215 | 215 | 215 | 195 | 218 | 215 | 215 | 215 |
| Relaxation treatment temperature | | ° C. | 215 | 215 | 215 | 215 | 215 | 215 | 195 | 218 | 215 | 215 | 215 |
| Relaxation rate | | % | 5.0 | 5.0 | 5.0 | 5.0 | 5.0 | 5.0 | 5.0 | 5.0 | 5.0 | 5.0 | 5.0 |
| Thickness | | µm | 15 | 15 | 15 | 15 | 15 | 15 | 15 | 15 | 15 | 15 | 15 |

TABLE 1-continued

|  |  | Example | | | | Comparative Example | | | | | | |
|---|---|---|---|---|---|---|---|---|---|---|---|---|
|  |  | 1 | 2 | 3 | 4 | 1 | 2 | 3 | 4 | 5 | 6 | 7 |
| Impact strength | J/15 μm | 0.8 | 0.9 | 0.8 | 0.8 | 0.9 | 1.0 | 1.4 | 0.6 | 1.3 | 0.6 | 1.2 |
| Heat shrinkage rate | MD % | 1.1 | 1.2 | 1.0 | 1.1 | 1.2 | 1.1 | 3.3 | 0.4 | 1.4 | 0.5 | 1.5 |
| 160° C., 10 minutes | TD % | 1.4 | 1.4 | 1.3 | 1.3 | 1.4 | 1.3 | 3.8 | 0.5 | 1.8 | 1.0 | 1.8 |
| Orientation angle | degrees | 24 | 23 | 21 | 23 | 25 | 24 | 20 | 28 | 27 | 22 | 25 |
| Strain at moisture absorption | % | 1.1 | 1.2 | 0.7 | 0.8 | 1.5 | 1.7 | 1.2 | 1.9 | 2.1 | 0.7 | 1.9 |
| Strain at thermal shrinkage | % | 1.7 | 1.8 | 1.5 | 1.4 | 2.0 | 1.7 | 1.3 | 2.4 | 2.0 | 1.3 | 2.3 |
| Oxygen permeability | ml/m² · day MPa | 111 | 115 | 118 | 120 | 110 | 111 | 109 | 114 | 108 | 121 | 105 |
| S-shape curling | Visual evaluation | B | B | A | A | C | C | C | C | C | B | C |

TABLE 2

|  |  |  | Example | | | | Comparative Example | | | | | | |
|---|---|---|---|---|---|---|---|---|---|---|---|---|---|
|  |  |  | 1 | 2 | 3 | 4 | 1 | 2 | 3 | 4 | 5 | 6 | 7 |
| Preparatory longitudinal stretch first stage | Temperature | ° C. | 80 | 85 | 85 | 85 | | | | | | | |
|  | Ratio | — | 1.03 | 1.02 | 1.07 | 1.07 | | | | | | | |
| Preparatory longitudinal stretch second stage | Temperature | ° C. | 80 | 85 | | | | | | | | | |
|  | Ratio | — | 1.03 | 1.02 | | | | | | | | | |
| Main longitudinal stretch first stage | Temperature | ° C. | 85 | 85 | 85 | 85 | 75 | 85 | 80 | 80 | 70 | 80 | 70 |
|  | Ratio | — | 2.1 | 2.0 | 2.0 | 2.0 | 1.7 | 2.1 | 1.7 | 1.7 | 1.7 | 1.7 | 3.3 |
| Main longitudinal stretch second stage | Temperature | ° C. | 75 | 75 | 75 | 75 | 70 | 70 | 70 | 70 | 70 | 65 | |
|  | Ratio | — | 1.5 | 1.6 | 1.4 | 1.4 | 1.9 | 1.6 | 1.8 | 1.8 | 1.9 | 1.5 | |
| Total ratio of longitudinal stretch | | — | 3.3 | 3.3 | 3.1 | 3.1 | 3.3 | 3.3 | 3.1 | 3.1 | 3.3 | 2.6 | 3.3 |
| Transverse stretch | Temperature | ° C. | 120 | 120 | 120 | 120 | 120 | 120 | 120 | 120 | 120 | 120 | 120 |
|  | Ratio | — | 3.7 | 3.7 | 3.7 | 3.7 | 3.7 | 3.7 | 3.7 | 3.7 | 4.0 | 4.0 | 4.0 |
| Heat setting temperature | | ° C. | 215 | 215 | 215 | 215 | 215 | 215 | 195 | 218 | 215 | 215 | 215 |
| Relaxation treatment temperature | | ° C. | 215 | 215 | 215 | 215 | 215 | 215 | 195 | 218 | 215 | 215 | 215 |
| Relaxation rate | | % | 5.0 | 5.0 | 5.0 | 5.0 | 5.0 | 5.0 | 5.0 | 5.0 | 5.0 | 5.0 | 5.0 |
| Thickness | Right side | μm | 15 | 15 | 15 | 15 | 15 | 15 | 15 | 15 | 15 | 15 | 15 |
|  | Left side |  | 15 | 15 | 15 | 15 | 15 | 15 | 15 | 15 | 15 | 15 | 15 |
| Impact strength | Right side | J/15 μm | 0.8 | 0.9 | 0.8 | 0.8 | 0.9 | 1.0 | 1.4 | 0.6 | 1.3 | 0.6 | 1.2 |
|  | Left side |  | 0.8 | 0.9 | 0.8 | 0.8 | 0.9 | 1.0 | 1.4 | 0.6 | 1.3 | 0.6 | 1.2 |
| Strain at moisture absorption | Right side | % | 1.1 | 1.3 | 0.7 | 0.8 | 1.5 | 1.7 | 1.1 | 1.9 | 2.2 | 0.7 | 1.9 |
|  | Left side |  | 1.1 | 1.2 | 0.7 | 0.8 | 1.5 | 1.7 | 1.2 | 1.9 | 2.1 | 0.7 | 1.9 |
| MD heat shrinkage rate 160° C., 10 minutes | Right side | % | 1.1 | 1.1 | 1.1 | 1.1 | 1.2 | 1.1 | 3.4 | 0.4 | 1.4 | 0.5 | 1.5 |
|  | Left side |  | 1.1 | 1.2 | 1.0 | 1.1 | 1.2 | 1.1 | 3.3 | 0.4 | 1.4 | 0.5 | 1.5 |
| TD heat shrinkage rate 160° C., 10 minutes | Right side | % | 1.4 | 1.3 | 1.4 | 1.3 | 1.4 | 1.3 | 3.9 | 0.5 | 1.7 | 1.0 | 1.8 |
|  | Left side |  | 1.4 | 1.4 | 1.3 | 1.3 | 1.4 | 1.3 | 3.8 | 0.5 | 1.8 | 1.0 | 1.8 |
| Strain at thermal shrinkage | Right side | % | 1.8 | 1.9 | 1.4 | 1.4 | 2.0 | 1.8 | 1.3 | 2.4 | 2.1 | 1.3 | 2.3 |
|  | Left side |  | 1.7 | 1.8 | 1.5 | 1.4 | 2.0 | 1.7 | 1.3 | 2.4 | 2.0 | 1.3 | 2.3 |
| Oxygen permeability | Right side | ml/m² | 108 | 109 | 124 | 120 | 110 | 108 | 112 | 114 | 105 | 125 | 105 |
|  | Left side | day · MPa | 111 | 115 | 118 | 120 | 110 | 111 | 109 | 114 | 108 | 121 | 105 |
| S-shape curling | Visual evaluation | — | B | B | A | A | C | C | C | C | C | B | C |

As indicated in Table 1, even though the biaxially oriented polyamide films of the invention of the present application in Examples 1 to 4 were slit rolls at the ends of the mill rolls, when the biaxially oriented polyamide films were made into bags, occurrence of S-shape curling was within a permissible range.

Meanwhile, the biaxially oriented polyamide films obtained in comparative examples other than Comparative Example 3 and Comparative Example 6 each had a molecular orientation angle larger than 20° and a strain at moisture absorption higher than 1.3%. Thus, when the biaxially oriented polyamide films were made into bags, impermissible amounts of S-shape curling occurred.

The biaxially oriented polyamide film obtained in Comparative Example 3 had a molecular orientation angle of 20° and a strain at moisture absorption not higher than 1.3%, but had a high heat shrinkage rate after heating for ten minutes at 160° C. Thus, when the biaxially oriented polyamide film was made into a bag, an impermissible amount of S-shape curling occurred, and a heat-sealed portion of the bag experienced shrinkage deformation.

The polyamide film mill roll obtained in Comparative Example 3, at each of the positions thereof that were inward by 300 mm from the right end and the left end in the transverse direction of the film, had a strain at moisture absorption not higher than 1.3% but had a high heat shrinkage rate after heating for ten minutes at 160° C. Thus, when the polyamide film mill roll was made into a bag, an impermissible amount of S-shape curling occurred, and a heat-sealed portion of the bag experienced shrinkage deformation.

The biaxially oriented polyamide film obtained in Comparative Example 6 had a strain at moisture absorption not higher than 1.3% and also experienced S-shape curling within a permissible range, but had a low impact strength. Thus, characteristics of a polyamide film required to have impact resistance were not satisfied.

The polyamide film mill roll obtained in Comparative Example 6, at each of the positions thereof that were inward by 300 mm from the right end and the left end in the transverse direction of the film, had a strain at moisture absorption not higher than 1.3% and also experienced S-shape curling within a permissible range, but had a low impact strength. Thus, characteristics of a polyamide film required to have impact resistance were not satisfied.

Example 5

A melted film was extruded at a temperature of 260° C. by using a co-extruding T-die facility for two types and three layers, and was electrostatically brought into close contact on a metal roll, which had been cooled to 30° C., by application of DC high voltage to cool and solidify the film, whereby an unstretched sheet having the following configuration was obtained.

The configuration was a layer B/layer A/layer B configuration, the total thickness of the unstretched sheet was 200 µm, and the ratio of the thickness of the layer A to the total thickness was 20%.

Composition forming the layer A:
100% by mass of polyamide MXD6 "trade name MX Nylon S6007, manufactured by MITSUBISHI GAS CHEMICAL COMPANY, INC." was used as a raw material.

Composition forming the layer B:
Raw materials were blended such that 53% by mass of the polyamide 6, 35% by mass of the polyamide MXD6, and 12% by mass of the masterbatch of silica fine particles and ethylene bis stearamide (polyamide 6 is a matrix), were contained.

By using a roll stretch machine, the unstretched film was subjected to a first stage of preparatory longitudinal stretch of 1.03 times at a stretch temperature of 80° C., then subjected to a second stage of preparatory longitudinal stretch of 1.03 times at a stretch temperature of 80° C., then subjected to a first stage of main longitudinal stretch of 2.1 times at 85° C., and further subjected to a second stage of main longitudinal stretch of 1.5 times at a stretch temperature of 70° C.

Then, the longitudinally stretched film was continuously guided to a tenter and subjected to transverse stretch of 4.0 times at 130° C. Then, the resultant film was subjected to heat setting treatment at 210° C. and further subjected to 5.0% relaxation treatment at 210° C. in the transverse direction. The film was successively cooled at 100° C., and corona treatment was performed on one surface thereof. Then, tenter-clip-held portions of both ends of the film were each trimmed by a width of 150 mm, whereby a mill roll of a biaxially oriented polyamide film having a thickness of 15 µm and a width of 6000 mm was obtained. The characteristic evaluation results of the film and the mill roll are indicated in Table 3 and Table 4.

Example 6

A mill roll of a polyamide film was obtained in the same manner as Example 1, except that the temperatures and the ratios in the preparatory longitudinal stretch and the ratios in the main longitudinal stretch were changed as indicated in Table 3 and Table 4. The characteristic evaluation results of the film and the mill roll are indicated in Table 3 and Table 4.

Example 7

A biaxially oriented polyamide film was obtained in the same manner as in Example 2, except that, as indicated in Table 2, one stage of preparatory longitudinal stretch was performed at a ratio that was set as in Table 3 and Table 4, the ratio in the second stage of main longitudinal stretch was changed, and the thickness of the unstretched film was changed to 180 µm. The characteristic evaluation results of the film and the mill roll are indicated in Table 3 and Table 4.

Example 8

A biaxially oriented polyamide film was obtained in the same manner as in Example 7, except that the film manufacturing device was changed to one having a mill roll width of 4000 mm. The characteristic evaluation results of the film and the mill roll are indicated in Table 3 and Table 4.

Comparative Example 8 to Comparative Example 14

Biaxially oriented polyamide films were obtained in the same manner as in the examples, except that: no preparatory longitudinal stretch was performed as indicated in Table 2; and, as the main longitudinal stretch, two stages of stretches were performed at the temperatures and the ratios indicated in Table 3 and Table 4. The characteristic evaluation results of the films and the mill rolls are indicated in Table 3 and Table 4.

TABLE 3

| | | | Example | | | | Comparative Example | | | | | | |
|---|---|---|---|---|---|---|---|---|---|---|---|---|---|
| | | | 5 | 6 | 7 | 8 | 8 | 9 | 10 | 11 | 12 | 13 | 14 |
| Preparatory longitudinal stretch first stage | Temperature | ° C. | 80 | 85 | 85 | 85 | | | | | | | |
| | Ratio | — | 1.03 | 1.02 | 1.07 | 1.07 | | | | | | | |
| Preparatory longitudinal stretch second stage | Temperature | ° C. | 80 | 85 | | | | | | | | | |
| | Ratio | — | 1.03 | 1.02 | | | | | | | | | |
| Main longitudinal stretch first stage | Temperature | ° C. | 85 | 85 | 85 | 85 | 75 | 85 | 80 | 80 | 70 | 80 | 70 |
| | Ratio | — | 2.1 | 2.0 | 2.0 | 2.0 | 1.7 | 2.1 | 1.7 | 1.7 | 1.7 | 1.7 | 3.3 |
| Main longitudinal stretch second stage | Temperature | ° C. | 75 | 75 | 75 | 75 | 70 | 70 | 70 | 70 | 70 | 65 | |
| | Ratio | — | 1.5 | 1.6 | 1.4 | 1.4 | 2.0 | 1.6 | 1.8 | 1.8 | 2.0 | 1.5 | |
| Total ratio of longitudinal stretch | | — | 3.4 | 3.4 | 3.1 | 3.1 | 3.4 | 3.4 | 3.1 | 3.1 | 3.4 | 2.6 | 3.3 |
| Transverse stretch | Temperature | ° C. | 130 | 130 | 130 | 130 | 130 | 130 | 130 | 130 | 130 | 130 | 130 |
| | Ratio | — | 4.0 | 4.0 | 4.0 | 4.0 | 4.0 | 4.0 | 4.0 | 4.0 | 4.0 | 4.0 | 4.0 |

TABLE 3-continued

|  |  | Example | | | | Comparative Example | | | | | | |
| --- | --- | --- | --- | --- | --- | --- | --- | --- | --- | --- | --- | --- |
|  |  | 5 | 6 | 7 | 8 | 8 | 9 | 10 | 11 | 12 | 13 | 14 |
| Heat setting temperature | °C. | 210 | 210 | 210 | 210 | 210 | 210 | 195 | 215 | 210 | 210 | 210 |
| Relaxation treatment temperature | °C. | 210 | 210 | 210 | 210 | 210 | 210 | 195 | 215 | 210 | 210 | 210 |
| Relaxation rate | % | 5.0 | 5.0 | 5.0 | 5.0 | 5.0 | 5.0 | 5.0 | 5.0 | 5.0 | 5.0 | 5.0 |
| Thickness | μm | 15 | 15 | 15 | 15 | 15 | 15 | 15 | 15 | 15 | 15 | 15 |
| Impact strength | J/15 μm | 1.1 | 1.2 | 1.0 | 1.1 | 1.1 | 1.1 | 1.5 | 0.7 | 1.4 | 0.6 | 1.2 |
| Heat shrinkage rate | MD % | 1.2 | 1.1 | 1.0 | 1.0 | 1.2 | 1.1 | 3.3 | 0.4 | 1.4 | 0.5 | 1.5 |
| 160° C., 10 minutes | TD % | 1.5 | 1.3 | 1.3 | 1.2 | 1.4 | 1.3 | 3.8 | 0.5 | 1.8 | 1.0 | 1.8 |
| Orientation angle | degrees | 25 | 23 | 21 | 23 | 25 | 24 | 20 | 28 | 27 | 22 | 25 |
| Strain at moisture absorption | % | 1.1 | 1.2 | 0.7 | 0.8 | 1.5 | 1.7 | 1.2 | 1.9 | 2.1 | 0.7 | 1.9 |
| Strain at thermal shrinkage | % | 1.8 | 1.9 | 1.5 | 1.4 | 2.0 | 1.7 | 1.3 | 2.4 | 2.0 | 1.3 | 2.3 |
| S-shape curling | Visual evaluation | B | B | A | A | C | C | C | C | C | B | C |

TABLE 4

|  |  |  | Example | | | | Comparative Example | | | | | | |
| --- | --- | --- | --- | --- | --- | --- | --- | --- | --- | --- | --- | --- | --- |
|  |  |  | 5 | 6 | 7 | 8 | 8 | 9 | 10 | 11 | 12 | 13 | 14 |
| Preparatory longitudinal stretch | Temperature | °C. | 85 | 85 | 85 | 85 | | | | | | | |
| first stage | Ratio | — | 1.03 | 1.02 | 1.02 | 1.02 | | | | | | | |
| Preparatory longitudinal stretch | Temperature | °C. | 85 | 85 | | | | | | | | | |
| second stage | Ratio | — | 1.03 | 1.02 | | | | | | | | | |
| Main longitudinal stretch | Temperature | °C. | 80 | 80 | 80 | 80 | 75 | 85 | 80 | 80 | 70 | 80 | 70 |
| first stage | Ratio | — | 2.0 | 2.0 | 2.0 | 2.0 | 2.0 | 2.0 | 1.7 | 1.7 | 1.7 | 1.7 | 3.3 |
| Main longitudinal stretch | Temperature | °C. | 75 | 75 | 75 | 75 | 70 | 70 | 70 | 70 | 70 | 75 | |
| second stage | Ratio | — | 1.4 | 1.5 | 1.4 | 1.5 | 1.6 | 1.6 | 1.8 | 1.8 | 1.9 | 1.5 | |
| Total ratio of longitudinal stretch | | — | 3.2 | 3.2 | 3.1 | 3.1 | 3.2 | 3.2 | 3.1 | 3.1 | 3.3 | 2.6 | 3.3 |
| Transverse stretch | Temperature | °C. | 120 | 120 | 120 | 120 | 120 | 120 | 120 | 120 | 120 | 120 | 120 |
|  | Ratio | — | 3.3 | 3.3 | 3.3 | 3.3 | 3.3 | 3.3 | 3.3 | 3.3 | 3.5 | 3.5 | 3.5 |
| Heat setting temperature | | °C. | 210 | 210 | 210 | 210 | 210 | 210 | 195 | 215 | 210 | 210 | 210 |
| Relaxation treatment temperature | | °C. | 210 | 210 | 210 | 210 | 210 | 210 | 195 | 215 | 210 | 210 | 210 |
| Relaxation rate | | % | 5.0 | 5.0 | 5.0 | 5.0 | 5.0 | 5.0 | 5.0 | 5.0 | 5.0 | 5.0 | 5.0 |
| Thickness | Right side | μm | 15 | 15 | 15 | 15 | 15 | 15 | 15 | 15 | 15 | 15 | 15 |
|  | Left side | | 15 | 15 | 15 | 15 | 15 | 15 | 15 | 15 | 15 | 15 | 15 |
| Impact strength | Right side | J/15 μm | 0.8 | 0.9 | 0.7 | 0.8 | 0.9 | 0.8 | 1.3 | 0.6 | 1.2 | 0.6 | 1.0 |
|  | Left side | | 0.8 | 0.9 | 0.7 | 0.7 | 0.9 | 0.8 | 1.3 | 0.6 | 1.2 | 0.6 | 1.1 |
| Strain at moisture absorption | Right side | % | 1.1 | 1.1 | 0.7 | 0.7 | 1.4 | 1.6 | 1.1 | 1.8 | 1.9 | 0.7 | 1.8 |
|  | Left side | | 1.1 | 1.1 | 0.7 | 0.7 | 1.4 | 1.6 | 1.2 | 1.8 | 1.8 | 0.7 | 1.9 |
| MD heat shrinkage rate | Right side | % | 0.9 | 0.9 | 0.9 | 0.9 | 0.9 | 1.0 | 3.2 | 0.5 | 1.1 | 0.5 | 1.3 |
| 16° C., 10 minutes | Left side | | 0.9 | 0.9 | 0.8 | 0.8 | 0.9 | 1.0 | 3.0 | 0.5 | 1.1 | 0.5 | 1.2 |
| TD heat shrinkage rate | Right side | % | 1.1 | 1.2 | 1.1 | 1.0 | 1.0 | 1.2 | 3.7 | 0.5 | 1.4 | 0.9 | 1.5 |
| 160° C., 10 minutes | Left side | | 1.1 | 1.2 | 1.0 | 1.1 | 1.0 | 1.2 | 3.5 | 0.5 | 1.4 | 0.9 | 1.4 |
| Strain at thermal shrinkage | Right side | % | 1.8 | 1.6 | 1.3 | 1.5 | 1.9 | 1.6 | 1.2 | 2.3 | 2.2 | 1.2 | 2.3 |
|  | Left side | | 1.7 | 1.7 | 1.4 | 1.4 | 1.8 | 1.7 | 1.3 | 2.3 | 2.1 | 1.2 | 2.4 |
| Oxygen permeability | Right side | ml/m² | 68 | 77 | 76 | 74 | 73 | 74 | 74 | 85 | 74 | 82 | 72 |
|  | Left side | day · MPa | 70 | 75 | 72 | 78 | 75 | 72 | 70 | 86 | 76 | 80 | 69 |
| S-shape curling | Visual evaluation | — | B | A | A | A | C | C | C | C | C | B | C |

As indicated in Table 3 and Table 4, even though the biaxially oriented polyamide films of the invention of the present application in Examples 5 to 8 were slit rolls at the ends of the mill rolls, when the biaxially oriented polyamide films were made into bags, occurrence of S-shape curling was within a permissible range.

Meanwhile, the biaxially oriented polyamide films obtained in the comparative examples other than Comparative Example 10 and Comparative Example 13 each had a molecular orientation angle larger than 20° and a strain at moisture absorption higher than 1.3%. Thus, when the biaxially oriented polyamide films were made into bags, impermissible amounts of S-shape curling occurred. In addition, each of the polyamide film mill rolls had a strain at moisture absorption higher than 1.3% at each of the positions thereof that were inward by 300 mm from the right end and the left end in the transverse direction of the film. Thus, when the polyamide film mill rolls were made into bags, impermissible amounts of S-shape curling occurred.

The biaxially oriented polyamide film obtained in Comparative Example 10 had a molecular orientation angle of 20° and a strain at moisture absorption not higher than 1.3%, but had a high heat shrinkage rate after heating for ten minutes at 160° C. Thus, when the biaxially oriented polyamide film was made into a bag, an impermissible amount of S-shape curling occurred, and a heat-sealed portion of the bag experienced shrinkage deformation. In addition, the polyamide film mill roll, at each of the positions thereof that were inward by 300 mm from the right end and the left end in the transverse direction of the film, had a strain at moisture absorption not higher than 1.3% but had a high heat shrinkage rate after heating for ten minutes at 160° C. Thus, when the polyamide film mill roll was made into a bag, an impermissible amount of S-shape curling occurred, and a heat-sealed portion of the bag experienced shrinkage deformation.

The biaxially oriented polyamide film obtained in Comparative Example 13 had a strain at moisture absorption not higher than 1.3% and also experienced S-shape curling within a permissible range, but had a low impact strength. Thus, characteristics of a polyamide film required to have impact resistance were not satisfied. In addition, the polyamide film mill roll, at each of the positions thereof that were inward by 300 mm from the right end and the left end in the transverse direction of the film, had a strain at moisture absorption not higher than 1.3% and also experienced S-shape curling within a permissible range, but had a low impact strength. Thus, characteristics of a polyamide film required to have impact resistance were not satisfied.

INDUSTRIAL APPLICABILITY

Each of the biaxially oriented polyamide film and the polyamide film mill roll of the present invention, even as a product that is close to an end of a mill roll, has favorable mechanical characteristics and thermal characteristics, and experiences little S-shape curling due to moisture absorption after being made into a bag. Thus, when the bag is filled with content, a malfunction is less likely to occur at conveyance of the bag or the like, and the workability is good. Furthermore, a shrinkage strain at high temperature is also low, and thus shrinkage deformation after the bag is heat-sealed is also low. Moreover, the biaxially oriented polyamide film and the polyamide film mill roll of the present invention have a high lamination strength and thus are less likely to be torn. Furthermore, the biaxially oriented polyamide film and the polyamide film mill roll of the present invention have excellent gas barrier properties and thus are suitable for use for various kinds of gas-barrier packaging purposes.

The invention claimed is:

1. A biaxially oriented polyamide film having at least one layer formed of a polyamide resin containing not lower than 60% by mass of poly(m-xylylene adipamide), wherein
a molecular orientation angle of the film is not smaller than 20°,
a strain at moisture absorption of the film is not higher than 1.3%,
an impact strength of the film is not lower than 0.7 J/15 μm, and
a heat shrinkage rate, after heating for ten minutes at 160° C., of the film is 0.6 to 3.0% in both an MD direction and a TD direction.

2. The biaxially oriented polyamide film according to claim 1, wherein an oxygen permeability of the biaxially oriented polyamide film is 60 to 140 ml/m²·day·MPa.

3. The biaxially oriented polyamide film according to claim 2, wherein a strain at thermal shrinkage, after heating for ten minutes at 160° C., of the film is not higher than 2.0%.

4. The biaxially oriented polyamide film according to claim 3, wherein a layer formed of a polyamide resin containing not lower than 60% by mass of polyamide 6 is laminated on at least one surface of the layer formed of the polyamide resin containing not lower than 60% by mass of poly(m-xylylene adipamide).

5. The biaxially oriented polyamide film according to claim 4, wherein a layer formed of a polyamide resin containing not lower than 60% by mass of polyamide 6 is laminated on each of both surfaces of the layer formed of the polyamide resin containing not lower than 60% by mass of poly(m-xylylene adipamide).

6. The biaxially oriented polyamide film according to claim 1, wherein a strain at thermal shrinkage, after heating for ten minutes at 160° C., of the film is not higher than 2.0%.

7. The biaxially oriented polyamide film according to claim 1, wherein a layer formed of a polyamide resin containing not lower than 60% by mass of polyamide 6 is laminated on at least one surface of the layer formed of the polyamide resin containing not lower than 60% by mass of poly(m-xylylene adipamide).

8. The biaxially oriented polyamide film according to claim 1, wherein a layer formed of a polyamide resin containing not lower than 60% by mass of polyamide 6 is laminated on each of both surfaces of the layer formed of the polyamide resin containing not lower than 60% by mass of poly(m-xylylene adipamide).

9. A polyamide film mill roll of a biaxially oriented polyamide film having at least one layer formed of a polyamide resin containing not lower than 60% by mass of poly(m-xylylene adipamide), wherein
a molecular orientation angle of the film at each of positions that are inward by 300 mm from a right end and a left end in a transverse direction of the film mill roll is not smaller than 20°,
an impact strength of the film at each position is not lower than 0.7 J/15 μm,
a strain at moisture absorption of the film at each position is not higher than 1.3%, and
a heat shrinkage rate, after heating for ten minutes at 160° C., of the film at each position is 0.6 to 3.0% in both an MD direction and a TD direction.

10. The polyamide film mill roll according to claim 9, wherein an oxygen permeability of the biaxially oriented polyamide film is 60 to 140 ml/m²·day·MPa.

11. The polyamide film mill roll according to claim 10, wherein a strain at thermal shrinkage, after heating for ten minutes at 160° C., of the film at each of the positions that are inward by 300 mm from the right end and the left end in the transverse direction of the polyamide film mill roll is not higher than 2.0%.

12. The polyamide film mill roll according to claim 11, wherein, in the biaxially oriented polyamide film, a layer formed of a polyamide resin containing not lower than 60% by mass of polyamide 6 is laminated on at least one surface of the layer formed of the polyamide resin containing not lower than 60% by mass of poly(m-xylylene adipamide).

13. The polyamide film mill roll according to claim 12, wherein, in the biaxially oriented polyamide film, a layer formed of a polyamide resin containing not lower than 60% by mass of polyamide 6 is laminated on each of both surfaces of the layer formed of the polyamide resin containing not lower than 60% by mass of poly(m-xylylene adipamide).

14. The polyamide film mill roll according to claim 9, wherein a strain at thermal shrinkage, after heating for ten minutes at 160° C., of the film at each of the positions that are inward by 300 mm from the right end and the left end in the transverse direction of the polyamide film mill roll is not higher than 2.0%.

15. The polyamide film mill roll according to claim 9, wherein, in the biaxially oriented polyamide film, a layer formed of a polyamide resin containing not lower than 60% by mass of polyamide 6 is laminated on at least one surface of the layer formed of the polyamide resin containing not lower than 60% by mass of poly(m-xylylene adipamide).

16. The polyamide film mill roll according to claim 9, wherein, in the biaxially oriented polyamide film, a layer formed of a polyamide resin containing not lower than 60% by mass of polyamide 6 is laminated on each of both surfaces of the layer formed of the polyamide resin containing not lower than 60% by mass of poly(m-xylylene adipamide).

\* \* \* \* \*